(12) United States Patent
Takemori et al.

(10) Patent No.: US 7,075,263 B2
(45) Date of Patent: Jul. 11, 2006

(54) MULTI-AXIS MOTOR CONTROL DEVICE RESONANCE FREQUENCY DETECTION DEVICE

(75) Inventors: Yoshitaka Takemori, Fukuoka (JP); Takehiko Komiya, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/541,571

(22) PCT Filed: Dec. 15, 2003

(86) PCT No.: PCT/JP03/16060

§ 371 (c)(1),
(2), (4) Date: Dec. 14, 2005

(87) PCT Pub. No.: WO2004/064239

PCT Pub. Date: Jul. 29, 2004

(65) Prior Publication Data
US 2006/0108961 A1 May 25, 2006

(30) Foreign Application Priority Data
Jan. 8, 2003 (JP) .............................. 2003-001939

(51) Int. Cl.
*G05B 19/33* (2006.01)
(52) U.S. Cl. ................. 318/575; 318/560; 318/568.16; 318/568.17; 901/1
(58) Field of Classification Search ................ 318/575, 318/568.16, 568.17, 560; 901/9
See application file for complete search history.

(56) References Cited

U.S. PATENT DOCUMENTS

| 5,048,552 | A | * | 9/1991 | Bourne ........................ 137/39 |
| 5,867,342 | A | * | 2/1999 | Hattori ..................... 360/77.08 |
| 6,250,146 | B1 | * | 6/2001 | Callendrier .................. 73/159 |
| 6,274,994 | B1 | * | 8/2001 | Tsutsui ........................ 318/560 |
| 6,646,397 | B1 | * | 11/2003 | Discenzo ..................... 318/439 |
| 6,822,415 | B1 | * | 11/2004 | Komiya et al. ............. 318/629 |
| 6,925,279 | B1 | * | 8/2005 | Kamoshita et al. ......... 399/303 |
| 6,936,990 | B1 | * | 8/2005 | Oyama et al. .............. 318/632 |
| 2002/0006009 | A1 | * | 1/2002 | Ooi et al. ................. 360/77.07 |
| 2002/0060545 | A1 | | 5/2002 | Inagaki et al. |

FOREIGN PATENT DOCUMENTS

| EP | 1 039 624 A2 | 9/2000 |
| JP | 6-78575 A | 3/1994 |
| JP | 6-245570 A | 9/1994 |
| JP | 10-210781 A | 8/1998 |
| JP | 2001-157478 A | 6/2001 |
| JP | 2002-175101 A | 6/2002 |
| WO | WO 01/82462 A1 | 11/2001 |
| WO | WO 02/082202 A1 | 10/2002 |

* cited by examiner

*Primary Examiner*—Rita Leykin
(74) *Attorney, Agent, or Firm*—Sughrue Mion, PLLC (57) ABSTRACT

A resonance frequency detecting device of a multi-shaft electric motor control apparatus includes a plurality of electric motor control systems having electric motors (31, 32) for driving machines (41, 42) and controllers (21, 22) for driving the electric motors (31,32), detectors (51,52) for detecting the operating amounts of the machines (41,42), signal processors (61,62) for analyzing the frequencies of the signals of the detectors (51,52) and outputting the frequencies as resonance frequencies, and output devices (81,82) for changing the signals of the signal processors (61,62) into graphs or numeric values, a command generator (11) for giving the electric motor control system a control command for transmitting a vibration to the machines (41, 42) is provided to input the signals of the detectors (51,52) to the signal processor (61) and to output them as resonance frequencies.

12 Claims, 13 Drawing Sheets

0     TIME     N
Fmin     FREQUENCY     Fmax

MULTI-AXIS MOTOR CONTROL DEVICE RESONANCE FREQUENCY DETECTION DEVICE

TECHNICAL FIELD

The present invention relates to a positioning device using an electric motor and more particularly to a resonance frequency detecting device of a multi-shaft electric motor control apparatus which serves to detect the resonance frequency of a multi-shaft machine by utilizing a positioning control system.

BACKGROUND ART

In a semiconductor manufacturing apparatus, a machine tool, an industrial robot or the like, a positioning control is often carried out by using an electric motor. Precision in the positioning is greatly influenced by a resonance frequency of a machine. For this reason, it is desirable to grasp an accurate resonance frequency in advance and at the same time, to accurately carry out a measurement in a state in which a control system is incorporated and operated. From the necessity, there has conventionally been used a method of analyzing a frequency characteristic by using FFT (Fast Fourier Transform) to obtain a resonance frequency. The conventional art will be described with reference to the drawings.

Figure 14:
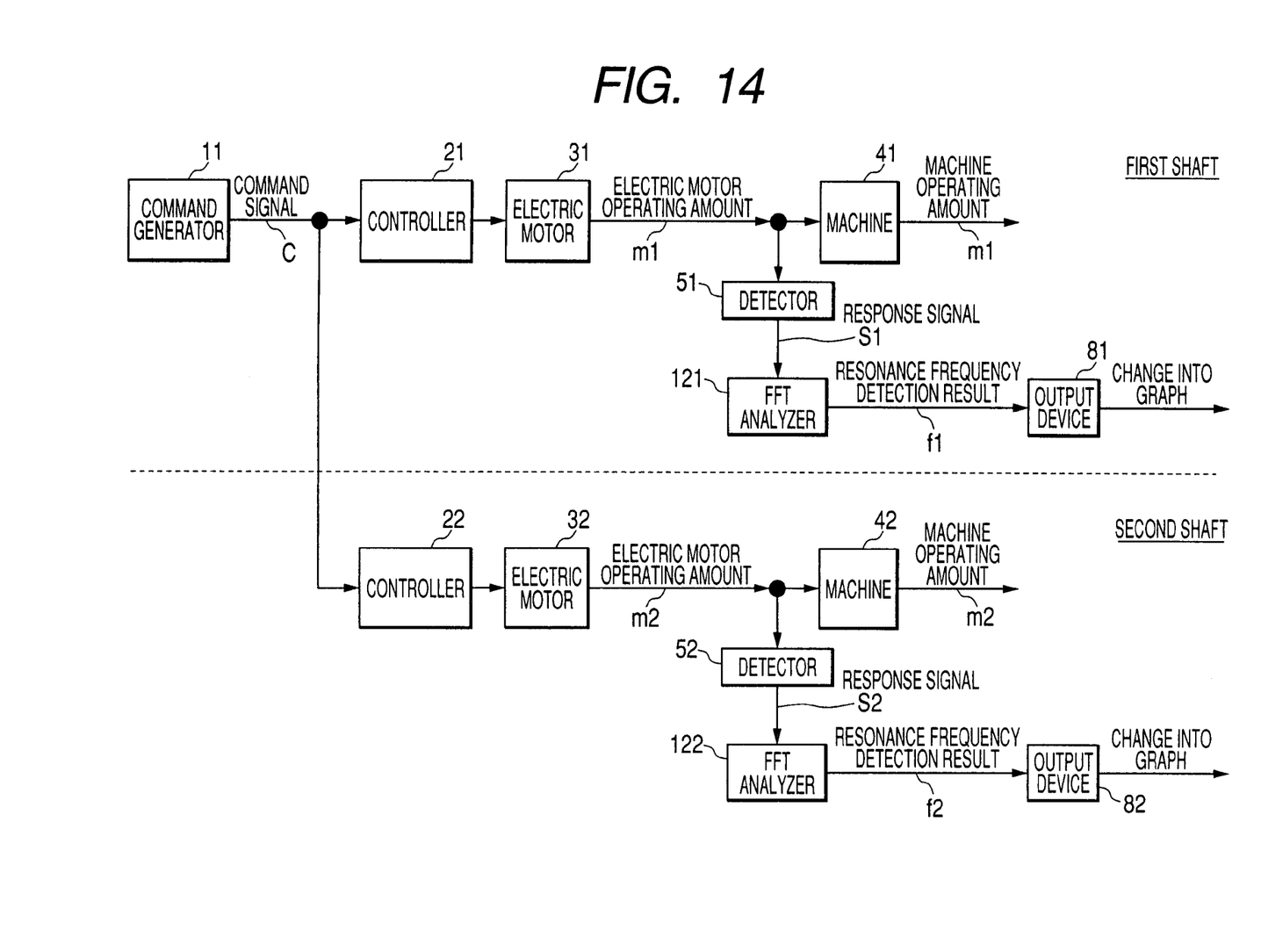
FIG. 14 is a block diagram showing the structure of an electric motor control system to which the conventional art is applied.

FIG. 14 is a block diagram showing the structure of a conventional resonance frequency detecting device (for example, see Japanese Patent Unexamined Publication JP-A-6-78575) which is incorporated in an electric motor control system. In FIG. 14, the conventional resonance frequency detecting device has a command generator 11, controllers 21 and 22 for supplying a driving current to electric motors 31 and 32 upon receipt of a command signal C from the command generator 11, the electric motors 31 and 32, machines 41 and 42 to be driven by the electric motors 31 and 32, detectors 51 and 52 for detecting electric motor operating amounts m1 and m2 of the electric motors 31 and 32, FFT analyzers 121 and 122 for executing an FFT calculation over response signals S1 and S2 to be the outputs of the detectors 51 and 52 to calculate resonance frequency detection results f1 and f2, and output devices 81 and 82 for outputting the resonance frequency detection results f1 and f2.

In the conventional resonance frequency detecting device, the command generator 11 generates the command signal C and inputs the command signal C to the controllers 21 and 22. When the controllers 21 and 22 supply a current to the electric motors 31 and 32 in response to the command, the electric motors 31 and 32 drive the machines 41 and 42. At this time, the detectors 51 and 52 detect the electric motor operating amounts m1 and m2 such as the rotating positions or rotating speeds of the electric motors 31 and 32 and output the response signals S1 and S2. The FFT analyzers 121 and 122 execute the FFT calculation when inputting the response signals S1 and S2, and calculate the resonance frequency detection results f1 and f2. When inputting the resonance frequency detection results f1 and f2, the output devices 81 and 82 output numeric values or graphs which are visualized. Thus, a resonance frequency is measured every single shaft.

In the conventional art, however, the resonance frequency is measured every single shaft. For this reason, only a resonance frequency for one shaft to be operated in accordance with the command output from the command generator can be measured and the resonance frequencies of the other shafts to influence the operating shaft cannot be measured. Therefore, a servo regulation has conventionally been carried out every shaft. In some cases in which a plurality of shafts is to be operated, an oscillation is caused. For this reason, there is a problem in that it is hard to carry out the servo regulation.

SUMMARY OF THE INVENTION

Therefore, it is an object of the invention to provide a resonance frequency detecting device of a multi-shaft electric motor control apparatus which can grasp the resonance frequencies of other shafts to influence an operating shaft, thereby carrying out a servo regulation easily also in a machine having the pluralities of shafts.

In order to achieve the object, according to a first aspect of the present invention, there is provided a resonance frequency detecting device of a multi-shaft electric motor control apparatus comprising an electric motor control system provided with each of a plurality of shaft of a machine, the electric motor control system having an electric motor for driving one of the plurality of shafts of a machine; and a controller for driving the electric motor upon receipt of a control command for each of the shafts, wherein the electric motor control system includes: a detector for detecting an operating amount of the machine; a signal processor for analyzing a frequency of a signal of the detector and outputting the frequency as a resonance frequency; and an output device for changing a signal of the signal processor into a graph or a numeric value to be output, characterized in that at least one command generator for giving the control command for transmitting a vibration to the machine to at least one of the electric motor control systems is provided to input signals of the detectors to the signal processors and to output them as resonance frequencies.

In the invention, the operating amount of each electric motor to be driven in accordance with a command signal sent from the command generator is detected and the signal is input to the signal processor. Consequently, it is possible to detect the resonance frequencies of a certain operating shaft and the other operating shafts, thereby grasping the influence of the operating shafts.

The invention according to a second aspect is characterized in that the signal processor inputs the signals of the detectors and outputs a sum of the signals as a resonance frequency.

In the invention, the sum of the signals of the detectors is output as the resonance frequency. Consequently, it is possible to detect the resonance frequencies of a certain operating shaft and the other operating shafts, thereby grasping the influence of the operating shafts.

The invention according to a third aspect of the present invention is characterized in that the detector serves to detect a position or speed of the electric motor or a position or speed of a movable portion of the machine.

In the invention, the position or speed to be the operating amount of each electric motor to be driven in accordance with the command signal sent from the command generator or the position or speed of the movable portion of the machine is detected and the signal is input to the signal processor. Consequently, it is possible to detect the resonance frequencies of a certain operating shaft and the other operating shafts, thereby grasping the influence of the operating shafts.

The invention according to a fourth aspect of the present invention is characterized in that in the case in which a part or all of the electric motor control systems is/are an open loop, a signal of the command generator is input to the controller of the electric motor control system of the open loop.

In the invention, the operating amount of the electric motor control system of the open loop is detected as the signal of the command generator and the signal is input to the signal processor. Consequently, it is possible to detect the resonance frequencies of a certain operating shaft and the other operating shafts, thereby grasping the influence of the operating shafts.

The invention according to a fifth aspect of the present invention characterized in that there is provided a closed loop controller for giving the controller a control command corresponding to a deviation between a control command sent from the command generator and the operating amount of the machine which is sent from the detector in a part or all of the electric motor control systems.

In the invention, the operating amount of each electric motor passing through the closed loop controller for giving the controller the control command corresponding to the deviation between the control command sent from the command generator and the operating amount of the machine which is sent from the detector is detected and the signal is input to the signal processor. Consequently, it is possible to detect the resonance frequencies of a certain operating shaft and the other operating shafts, thereby grasping the influence of the operating shafts.

The invention according to a sixth aspect of the present invention is characterized in that there are provided a closed loop controller for outputting a control command corresponding to a deviation between the operating amount of the machine which is sent from the detector and an operation command and a filter processing portion for reducing a signal in a predetermined band included in the control command in a part or all of the electric motor control systems, a sum of an output of the filter processing portion and a command signal sent from the command generator being input to the controller.

In the invention, the sum of the output of the filter processing portion and the command signal sent from the command generator is input to the signal processor. Consequently, it is possible to detect the resonance frequencies of a certain operating shaft and the other operating shafts, thereby grasping the influence of the operating shafts.

The invention according to a seventh aspect of the present invention is characterized in that the control command is a sweep sine wave signal, and the signal processor serves to input a frequency information of the sweep sine wave signal output from the command generator and a signal of at least one of the detectors and to output, as a resonance frequency, a frequency of the sine wave signal at which an absolute value of the signal of the detector is maximized.

In the invention, the frequency of the sine wave signal at which the absolute value of the signal of the detector is maximized is output as the resonance frequency. Consequently, it is possible to detect the resonance frequencies of a certain operating shaft and the other operating shafts, thereby grasping the influence of the operating shafts.

The invention according to an eighth aspect of the present invention is characterized in that the output device serves to output a signal of at least one of the signal processors as a frequency characteristic.

In the invention, the output device can change the signal of at least one of the signal processors into a graph or a numeric value, thereby confirming the resonance frequency.

The invention according to a ninth aspect of the present invention is characterized in that a control command for transmitting a vibration from the command generator to a machine has a frequency limited to a range from a minimum frequency Fmin to a maximum frequency Fmax, and the signal processor limits a signal of the detector to a predetermined frequency range and inputs the signal, and detects only a frequency which is equal to or higher than the minimum frequency Fmin.

In the invention, the signal processor limits the signal of the detector to the predetermined frequency range and inputs the same signal. Consequently, it is possible to grasp a resonance frequency which is equal to or higher than the minimum frequency Fmin.

The invention according to a tenth aspect of the present invention is characterized in that a control command for transmitting a vibration from the command generator to a machine has a frequency limited to a range from a minimum frequency Fmin to a maximum frequency Fmax, and the signal processor limits a signal of the detector to a predetermined frequency range and inputs the signal, and detects only a frequency which is higher than the minimum frequency Fmin and is equal to or higher than a detected minimum frequency Flim.

In the invention, the signal processor limits the signal of the detector to a predetermined frequency range and inputs the same signal. Consequently, it is possible to grasp a resonance frequency which is higher than the minimum frequency Fmin and is equal to or higher than Flim.

The invention according to an eleventh aspect of the present invention is characterized in that a high-pass filter is provided between the detector and the signal processor.

In the invention, a signal obtained after a passage through the high-pass filter is input to the signal processor. Consequently, it is possible to grasp a resonance frequency in which a certain frequency or more is cut.

The invention according to a twelfth aspect of the present invention is characterized in that a switch for inputting a signal of the detector for a shaft to signal processors for the other shafts is provided.

In the invention, the switch is provided. Consequently, it is possible to grasp the influence of the shafts by means of one signal processor or more.

BEST MODE FOR CARRYING OUT THE INVENTION

Embodiments of the present invention will be described below with reference to FIGS. 1 to 13.

Figure 1:
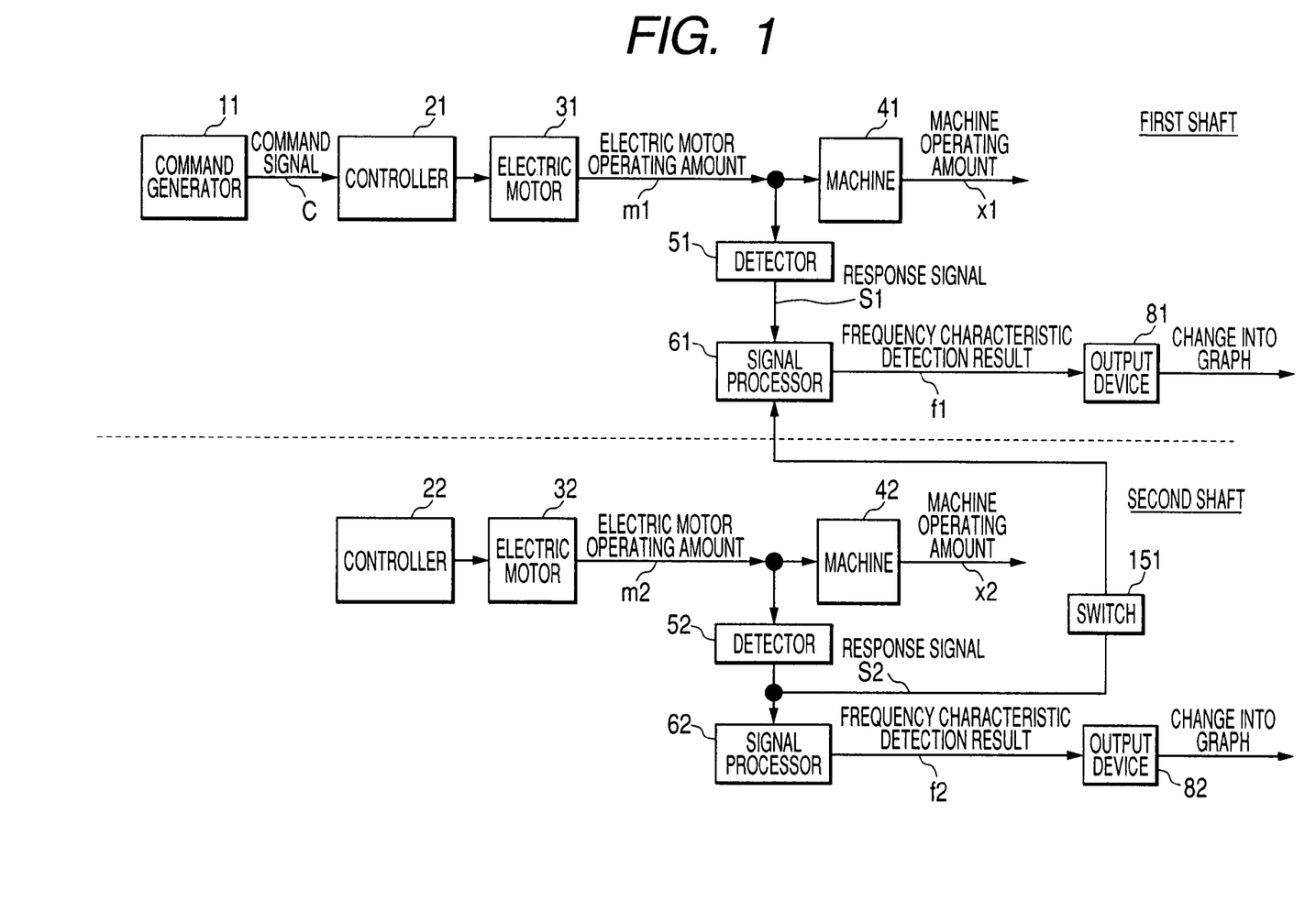
FIG. 1 is a block diagram showing the structure of a resonance frequency detecting device according to a first embodiment of the invention.

FIG. 1 is a block diagram showing the structure of a resonance frequency detecting device according to a first embodiment of the present invention. Corresponding portions to the structure of a conventional resonance frequency detecting device shown in FIG. 14 have the same reference numerals.

In FIG. 1, the resonance frequency detecting device has an electric motor control system for a first shaft and an electric motor control system for a second shaft, and comprises a command generator 11, controllers 21 and 22, electric motors 31 and 32, machines 41 and 42 to be driven by the electric motors 31 and 32, detectors 51 and 52 for detecting electric motor operating amounts m1 and m2 of the electric motors 31 and 32, signal processors 61 and 62 for executing a signal processing over response signals S1 and S2 to be the outputs of the detectors 51 and 52 to calculate resonance frequency detection results f1 and f2, output devices 81 and 82 for outputting the resonance frequency detection results f1 and f2, and a switch 151 for adding the response signal S2 of the detector 52 for the second shaft to the signal processor 61 for the first shaft. The electric motor control apparatus shown in FIG. 1 has an integral structure in which both of the machines 41 and 42 are mounted on a fixing table or the like.

In the resonance frequency detecting device according to the first embodiment, the command generator 11 outputs a command signal C and the controller 21 drives the electric motor 31 in accordance with the command signal C received from the command generator 11. The outputs of the detectors 51 and 52 coupled to the electric motors 31 and 32 are transmitted as the response signals S1 and S2 to the signal processors 61 and 62 by the detection of the electric motor operating amounts m1 and m2. The electric motor 31 and the machine 41, and the electric motor 32 and the machine 42 are coupled to each other. Thus, if the electric motor operating amounts m1 and m2 are detected, it is possible to detect the resonance characteristic of the machine 41 and that of the machine 42 to influence the machine 41. The response signals S1 and S2 have resonance frequencies at which the machines 41 and 42 exhibit a great reaction by a small external force depending on the frequency. When the signal processors 61 and 62 analyze the frequency, the resonance frequency can be detected. The frequency characteristic detection results f1 and f2 to be the outputs of the signal processors 61 and 62 can be output in graphs or numeric values to the output devices 81 and 82.

The output side of the detector 52 for the second shaft and the signal processor 61 for the first shaft are connected to each other through the switch 151. When the switch 151 is off, the response signals S1 and S2 are sent to the signal processors 61 and 62 to detect the frequency characteristic detection results f1 and f2. When the switch 151 is on, the response signal S2 is input to the signal processor 61 and the sum of the response signals S1 and S2 is detected by the signal processor 61. Consequently, the resonance characteristic of the machine 41 and that of the machine 42 to influence the machine 41 are detected and output by the output device 81.

While the description has been given to the example in which the two electric motor control systems are provided in the first embodiment, the present invention can also be applied to the case in which three or more electric motor control systems are provided.

Figure 2:
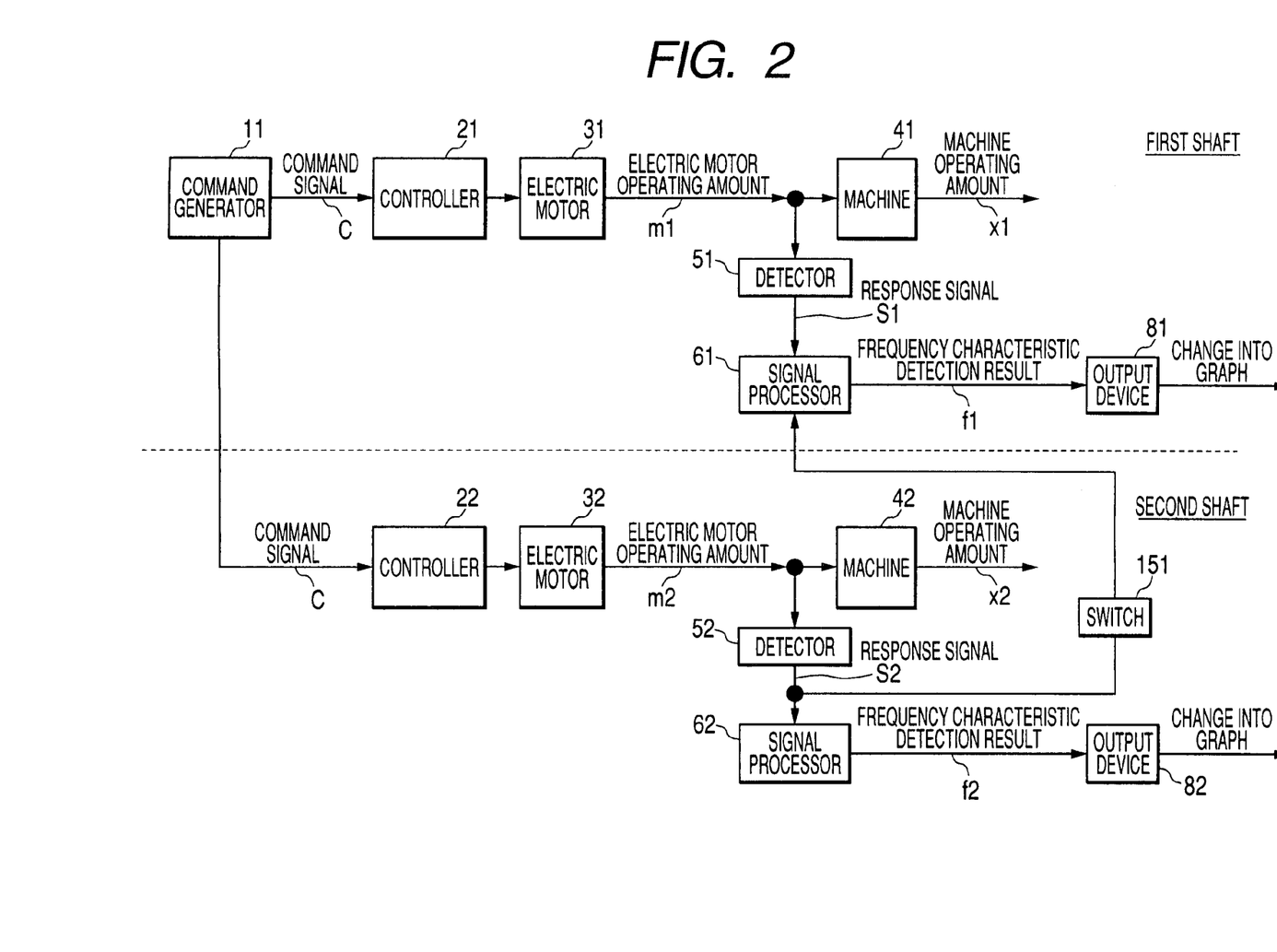
FIG. 2 is a block diagram showing a structure according to a second embodiment of the invention.

FIG. 2 is a block diagram showing a structure according to a second embodiment of the invention, which is different from the first embodiment shown in FIG. 1 in that a command signal C output from a command generator 11 is input to both a controller 21 and a controller 22 and two electric motors 31 and 32 are operated at the same time. A resonance frequency can be detected in the same manner as in the first embodiment.

In the second embodiment, electric motor operating amounts m1 and m2 of the electric motors 31 and 32 to be driven in accordance with the command signal C sent from the command generator 11 are detected and signals are input to signal processors 51 and 52. Consequently, it is possible to detect the resonance frequency of each of the electric motor control systems. By inputting the sum of the electric motor operating amounts m1 and m2 to a signal processor 61, furthermore, it is possible to grasp the influence of operating shafts.

While a switch 151 is provided to input a response signal S2 to the signal processor 61 in the second embodiment, a switch may be provided to input a response signal S1 to a signal processor 62.

Although two electric motor control systems are operated in FIG. 2, moreover, any number of electric motor control systems may be provided.

Figure 3:
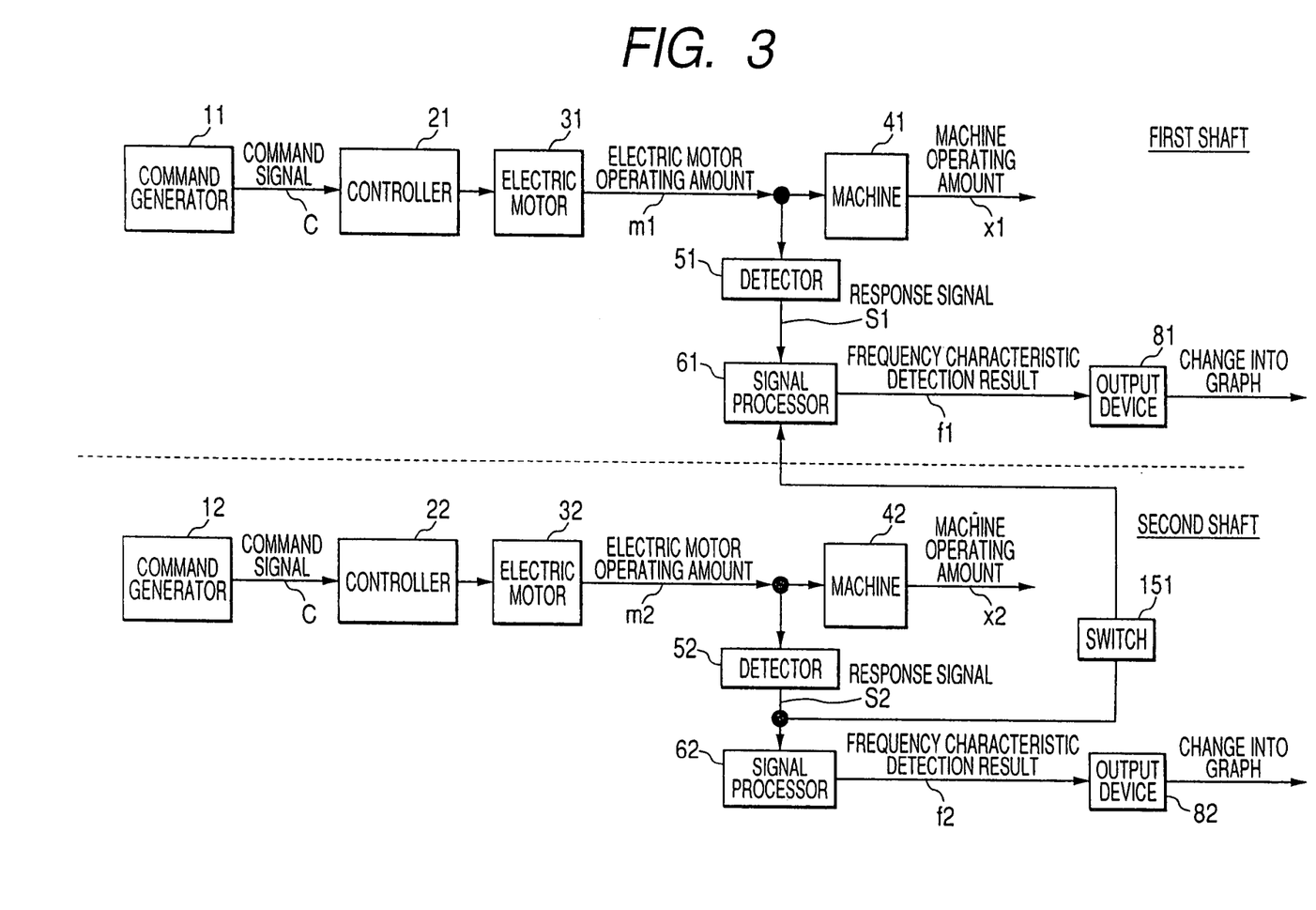
FIG. 3 is a block diagram showing a structure according to a third embodiment of the invention.

FIG. 3 is a block diagram showing a structure according to a third embodiment, which is different from FIG. 1 in that a command signal C output from a command generator 12 is input to a controller 22 and two electric motors 31 and 32 are operated at the same time.

A resonance frequency can be detected in the same manner as in the first embodiment or the second embodiment.

In the third embodiment, identical command signals or different command signals are given from two command generators 11 and 12 to electric motor control systems to detect electric motor operating amounts m1 and m2 of the electric motors 31 and 32, and are input to signal processors 61 and 62. Consequently, it is possible to detect the resonance frequency of each of the electric motor control systems. By inputting the sum of the electric motor operating amounts m1 and m2 to the signal processor 61, furthermore, it is possible to grasp the influence of operating shafts.

While the number of the combinations of the command generator and the electric motor control system is two in FIG. 3, any number of combinations may be employed.

Figure 4:
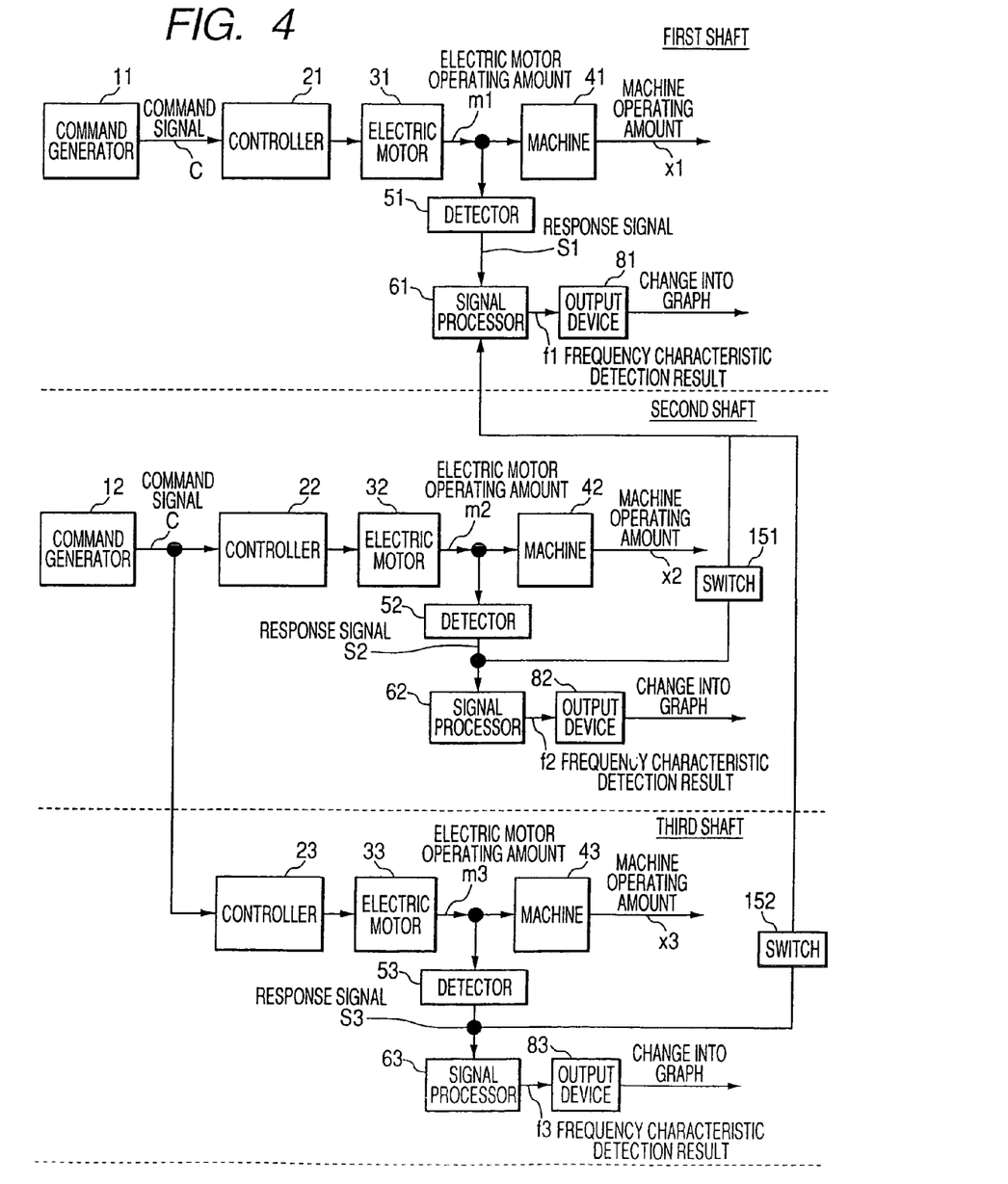
FIG. 4 is a block diagram showing a structure according to a fourth embodiment of the invention.

FIG. 4 is a block diagram showing a structure according to a fourth embodiment, which is different from FIG. 1 in that a command signal C output from a command generator 12 is input to controllers 22 and 23 and three electric motors 31, 32 and 33 are operated at the same time and that detectors 52 and 53 and switches 151 and 152 are constituted in parallel.

When the switches 151 and 152 are off, response signals S2 and S3 are input to signal processors 62 and 63.

When the switch 151 is on, the response signal S2 is input to a signal processor 61.

When the switch 152 is on, the response signal S3 is input to the signal processor 61.

When the switches 151 and 152 are on, the response signals S2 and S3 are input to the signal processor 61.

A resonance frequency can be detected in the same manner as in any of the first to third embodiments.

In the fourth embodiment, an identical command signal or a different command signal is given to one electric motor control system by means of a command generator 11, and is given to the other electric motor control systems by means of the command generator 12 to detect electric motor operating amounts m1, m2 and m3 of the electric motors 31, 32 and 33, and each signal is input to each of the signal processors 61, 62 and 63. Consequently, it is possible to detect the resonance frequency of each of the electric motor control systems. By inputting the sum of the electric motor operating amounts m1, m2 and m3 to the signal processor 61, furthermore, it is possible to grasp the influence of operating shafts.

While the switches are provided to input the response signals S2 and S3 to the signal processor 61 in the fourth embodiment, they may be provided to input the response signals S1 and S3 to the signal processor 62 and the response signals S1 and S2 to the signal processor 63.

While one electric motor control system is operated by the command generator 11 and two electric motor control systems are operated by the command generator 12 in FIG. 4, moreover, the numbers of the command generators and the electric motor control systems may be optional.

Figure 5:
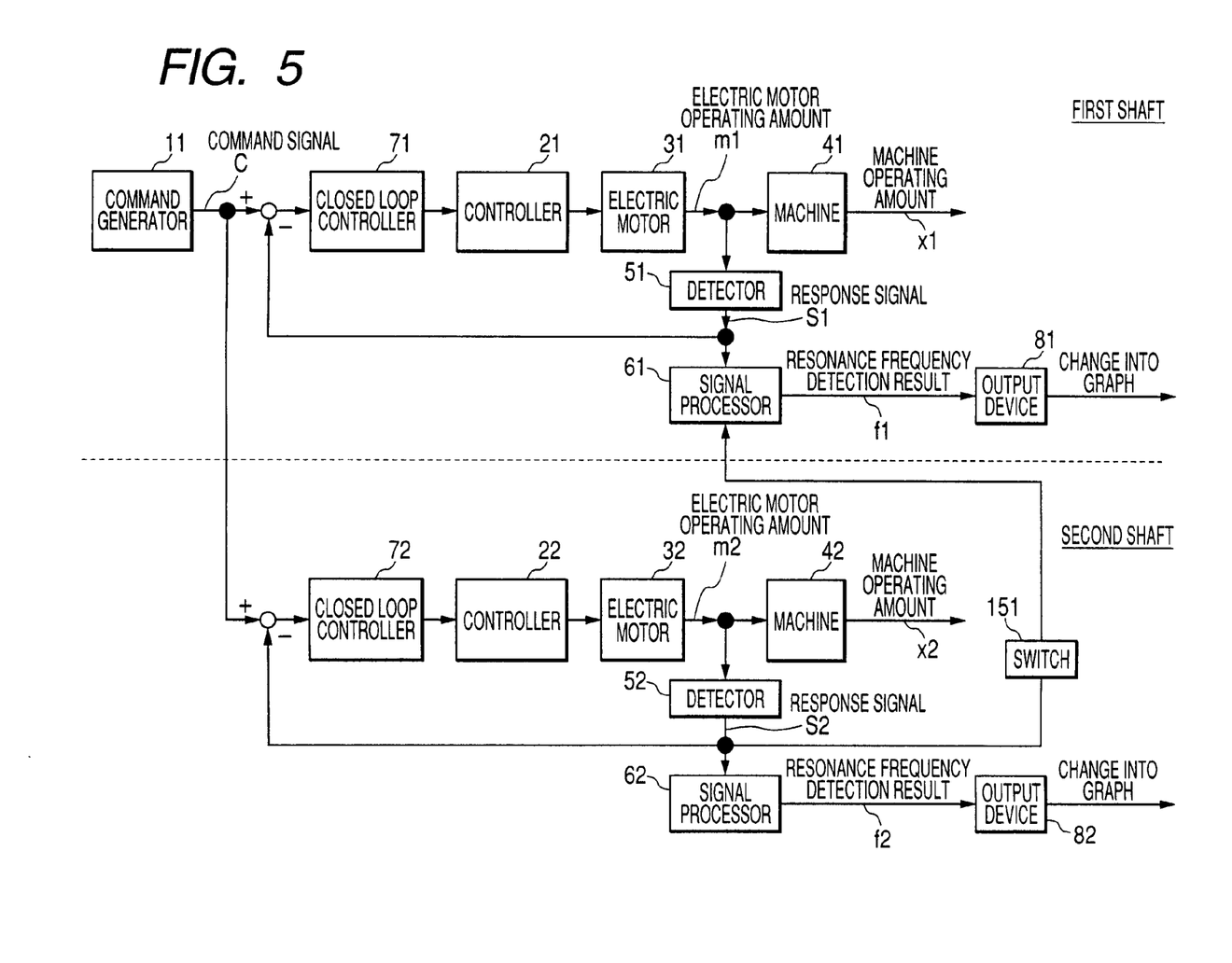
FIG. 5 is a block diagram showing a structure according to a fifth embodiment of the invention.

FIG. 5 is a block diagram showing a structure according to a fifth embodiment, illustrating the case in which at least one electric motor control system constitutes a closed loop. In FIG. 5, detectors 51 and 52 are provided to detect electric motor operating amounts m1 and m2 of electric motors 31 and 32, and furthermore, closed loop controllers 71 and 72 are provided in the former stages of controllers 21 and 22 and subtractors are provided in the former stages. A command to be applied to a (+) terminal of the subtractor and the signals of the detectors 51 and 52 are compared with a command signal C, and the closed loop controllers 71 and 72 receiving a difference thereof are operated to reduce the difference, thereby outputting commands to the controllers 21 and 22. A command generator 11, signal processors 61 and 62, output devices 81 and 82 and a switch 151 are added to the closed loop control systems, and the command signal C of the command generator 11 is applied to the (+) terminal of the subtractor. A resonance frequency can be detected in the same manner as in any of the first to fourth embodiments.

In the fifth embodiment, the electric motor operating amounts m1 and m2 of the electric motors 31 and 32 to be driven in accordance with the command signal sent from the command generator 11 are detected and signals are input to the signal processors 61 and 62. Consequently, it is possible to detect the resonance frequency of each of the electric motor control systems. By inputting the sum of the electric motor operating amounts m1 and m2 to the signal processor 61, furthermore, it is possible to grasp the influence of operating shafts.

While the two electric motor control systems are provided in FIG. 5, the number of the electric motor control systems may be optional.

Figure 6:
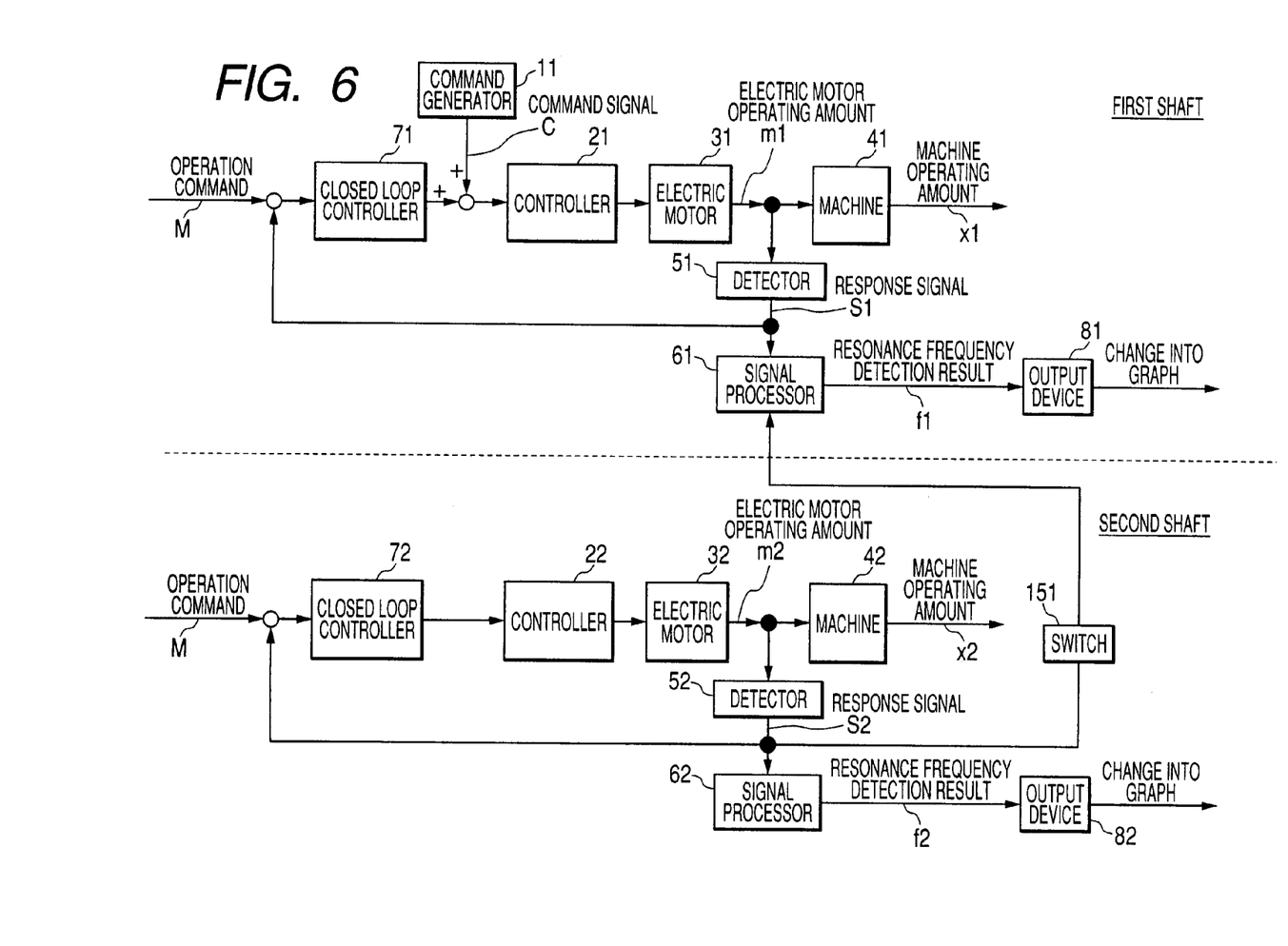
FIG. 6 is a block diagram showing a structure according to a sixth embodiment of the invention.

FIG. 6 is a block diagram showing a structure according to a sixth embodiment. Although the command signal C output from the command generator 11 is applied to the (+) terminal of the subtractor in FIG. 5, it is applied to one of the input terminals of an adder provided between a controller 21 and a closed loop controller 71. With such a structure, a resonance frequency can be detected in the same manner as in any of the first to fifth embodiments.

In the sixth embodiment, electric motor operating amounts m1 and m2 of electric motors 31 and 32 to be driven in accordance with a command signal sent from a command generator 11 are detected and signals are input to signal processors 61 and 62. Consequently, it is possible to detect the resonance frequency of a machine 41 and that of a machine 42 to influence the machine 41. By inputting the sum of the electric motor operating amounts m1 and m2 to the signal processor 61, furthermore, it is possible to grasp the influence of operating shafts.

While two electric motor control systems are provided in FIG. 6, the number of the electric motor control systems may be optional.

Figure 7:
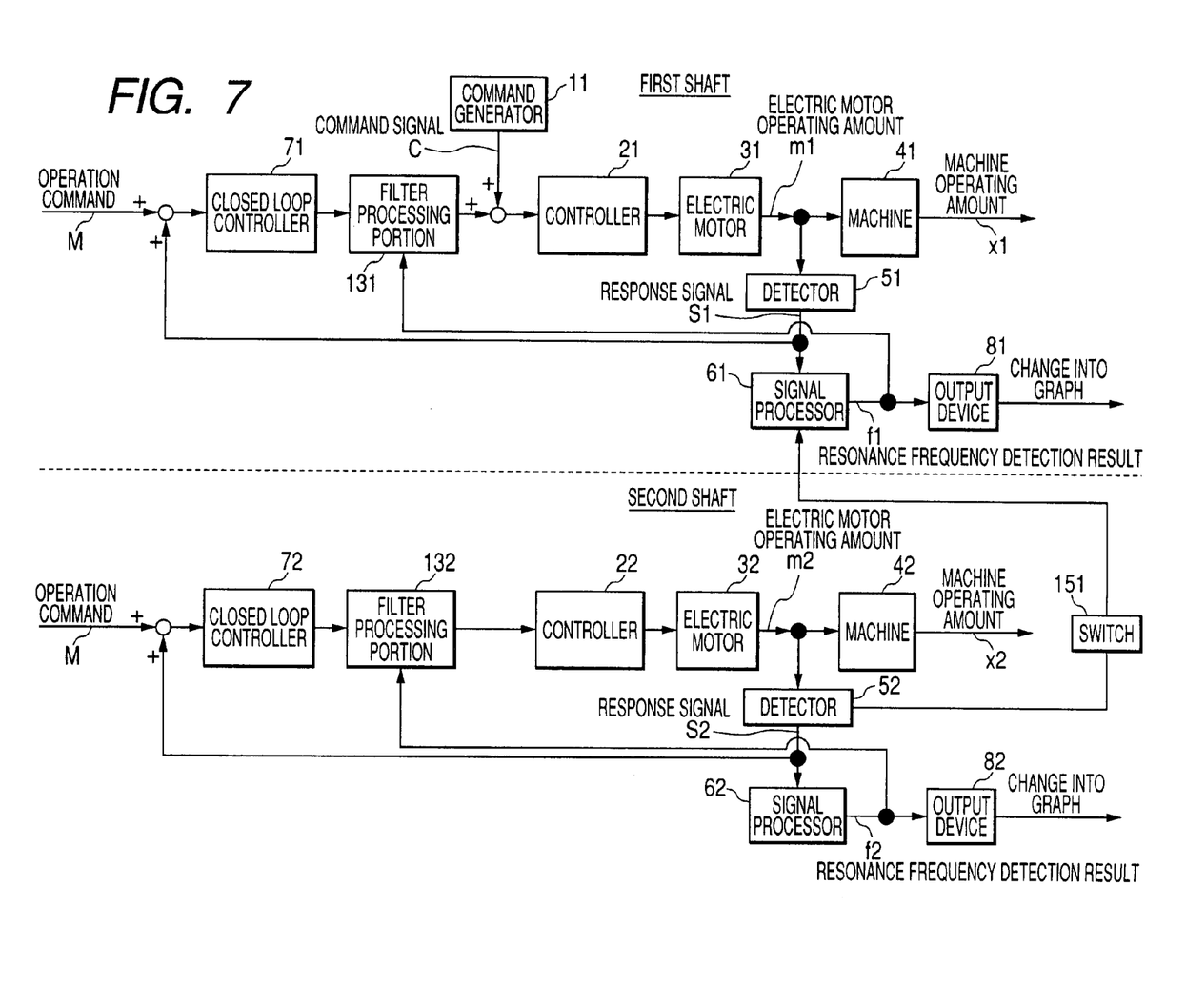
FIG. 7 is a block diagram showing a structure according to a seventh embodiment of the invention.

FIG. 7 is a block diagram showing a structure according to a seventh embodiment. FIG. 7 shows a structure in which filter processing portions 81 and 82 are additionally inserted in the latter stages of the closed loop controllers 71 and 72 in FIG. 6, and filter processing portions 131 and 132 can give commands from an outside to change a filter characteristic. When a signal processor 61 detects a resonance frequency to input resonance frequency detection results f1 and f2 to the filter processing portions 131 and 132 in the same manner as in the sixth embodiment, the filter processing portions 131 and 132 are set corresponding to the input so that a filter for suppressing the characteristic of a resonance frequency band can be obtained. If the resonance frequency can be detected, the set values of the filter processing portions 131 and 132 can be determined automatically based on the resonance frequency detection results f1 and f2. The resonance frequency can be detected in the same manner as in any of the first to sixth embodiments.

In the seventh embodiment, electric motor operating amounts m1 and m2 of electric motors 31 and 32 to be driven in accordance with a command signal sent from a command generator 11 are detected and signals are input to the signal processors 61 and 62. Consequently, it is possible to detect the resonance frequency of a machine 41 and that of a machine 42 to influence the machine 41. By inputting the sum of the electric motor operating amounts m1 and m2 to the signal processor 61, furthermore, it is possible to grasp the influence of operating shafts.

While a command signal C is input to one of adders provided between the filter processing portions 131 and 132 and controllers 21 and 22 in the embodiment, it may be input to the (+) terminals of subtractors provided in the former stages of the closed loop controllers 71 and 72.

While two electric motor control systems are provided in FIG. 7, moreover, the number of the electric motor control systems may be optional.

Figure 8:
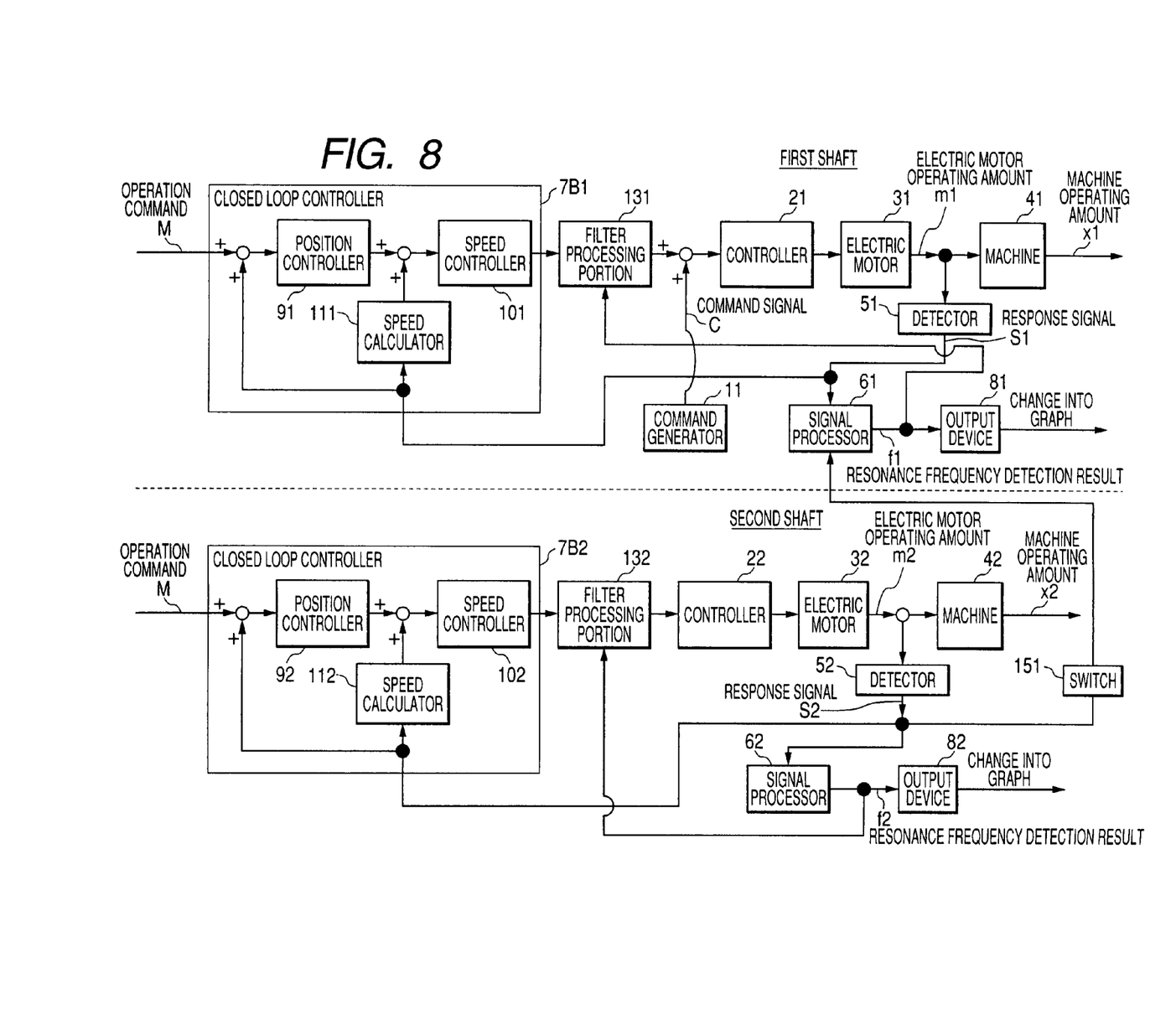
FIG. 8 is a block diagram showing a structure according to an eighth embodiment of the invention.

FIG. 8 is a block diagram showing a structure according to an eighth embodiment, illustrating a structure in which the structures of the closed loop controllers 71 and 72 and the vicinity of the subtractors in the former stages in FIG. 7 are changed. Closed loop controllers 7B1 and 7B2 are constituted by subtractors, position controllers 91 and 92, adders, speed controllers 101 and 102, and speed calculators 111 and 112. In FIG. 8, an operation command M having a magnitude of 0 is given to the (+) terminals of the subtractors in the former stages of the position controllers 91 and 92. Consequently, a resonance frequency is detected without a position shifted. In the closed loop controllers 7B1 and 7B2, response signals S1 and S2 obtained by detecting electric motor operating amounts m1 and m2 are input to the position controllers 91 and 92 through the subtractors, and at the same time, are input to the speed controllers 101 and 102 through the speed calculators 111 and 112. Then, the speed controllers 101 and 102 are controlled to be coincident with the outputs of the position controllers 91 and 92, and the position controllers 91 and 92 control in such a manner that the positions of the electric motor operating amounts m1 and m2 are coincident with the 0 position of the operation command M. The resonance frequency can be detected in the same manner as in any of the first to sixth embodiments.

In the eighth embodiment, the electric motor operating amounts m1 and m2 of electric motors 31 and 32 to be driven in accordance with a command signal sent from a command generator 11 are detected and signals are input to signal processors 61 and 62. Consequently, it is possible to detect the resonance frequency of a machine 41 and that of a machine 42 to influence the machine 41. By inputting the sum of the electric motor operating amounts m1 and m2 to the signal processor 61, furthermore, it is possible to grasp the influence of operating shafts.

While two electric motor control systems are provided in FIG. 8, the number of the electric motor control systems may be optional.

Figure 9:
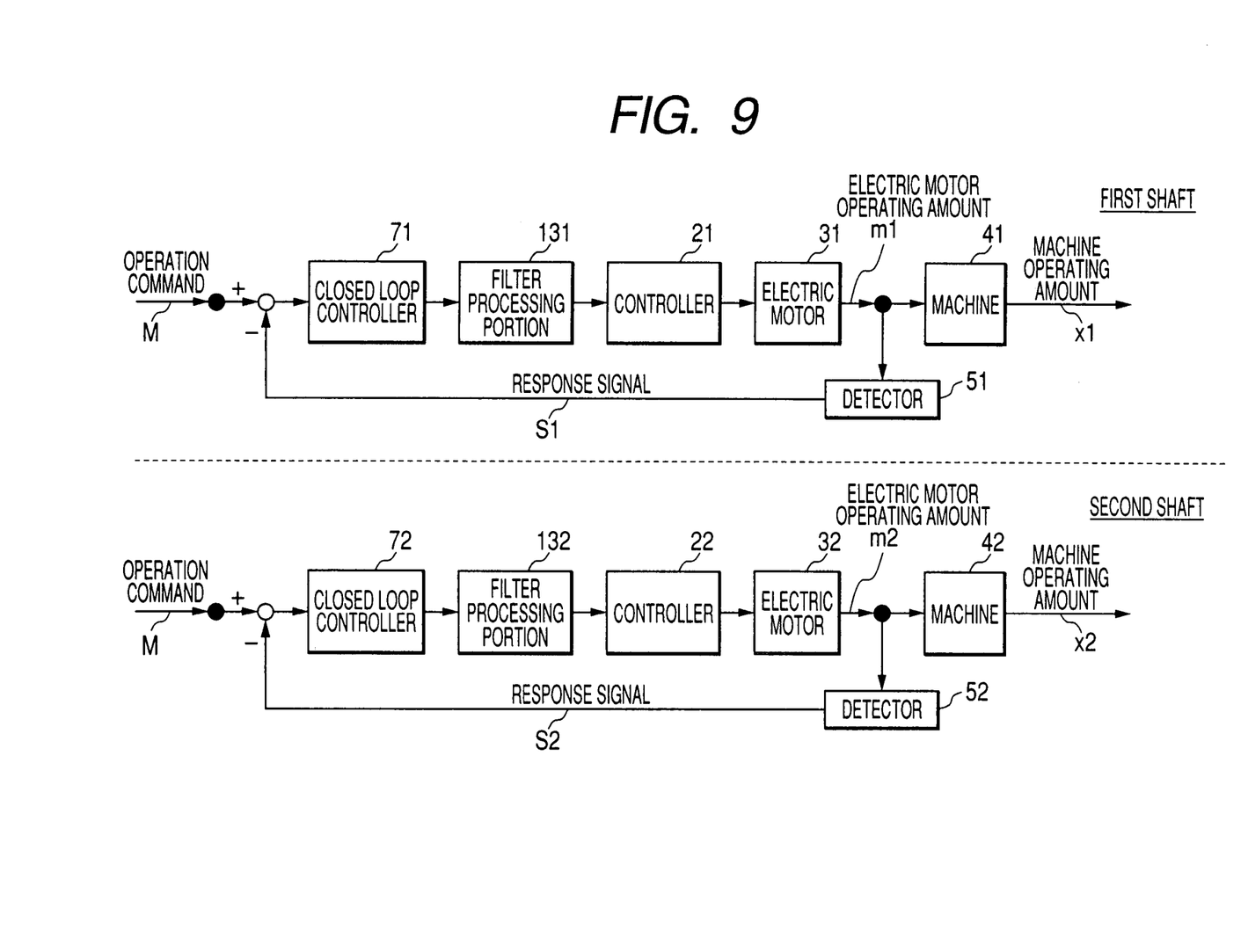
FIG. 9 is a block diagram showing a structure obtained after setting a filter in the seventh and eighth embodiments of the present invention.

FIG. 9 is a block diagram showing a structure obtained when the filter characteristics of filter processing portions 131 and 132 are set based on the resonance frequency detected by the resonance frequency detecting device according to each of the seventh and eighth embodiments and a normal operation is then carried out by making the most of the filter characteristics of the filter processing portions 131 and 132 which are set. When the operation command M is input by a control system, the closed loop controllers 71 and 72 carry out a control in such a manner that the electric motor operating amounts m1 and m2 and the operation command M are coincident with each other, and the filter processing portions 131 and 132 for suppressing a resonance function well so that the electric motor operating amounts m1 and m2 and the operation command M can be caused to be coincident with each other more easily.

A switch may be provided to change over the structure of FIG. 9 and that of FIG. 7. While the closed loop controllers 71 and 72 are shown as one controller in FIGS. 5, 6, 7 and 9, moreover, it is also possible to employ a structure in which the position controllers 91 and 92, the speed calculators 111 and 112, and the speed controllers 101 and 102 are included as in the structures of the closed loop controllers 7B1 and 7B2 in FIG. 8. If the operations of the electric motors 31 and 32 are controlled based on the response signals S1 and S2 detected by detectors 51 and 52 in such a manner that the operating amount of the machine is coincident with a command signal, moreover, it is also possible to employ the closed loop controllers 71 and 72 having internal structures changed. It is also possible to change an order and a structure including filter processing portions 81 and 82 and controllers 21 and 22.

While two electric motor control systems are provided in the example of FIG. 9, moreover, the number of the electric motor control systems may be optional.

Figure 10:
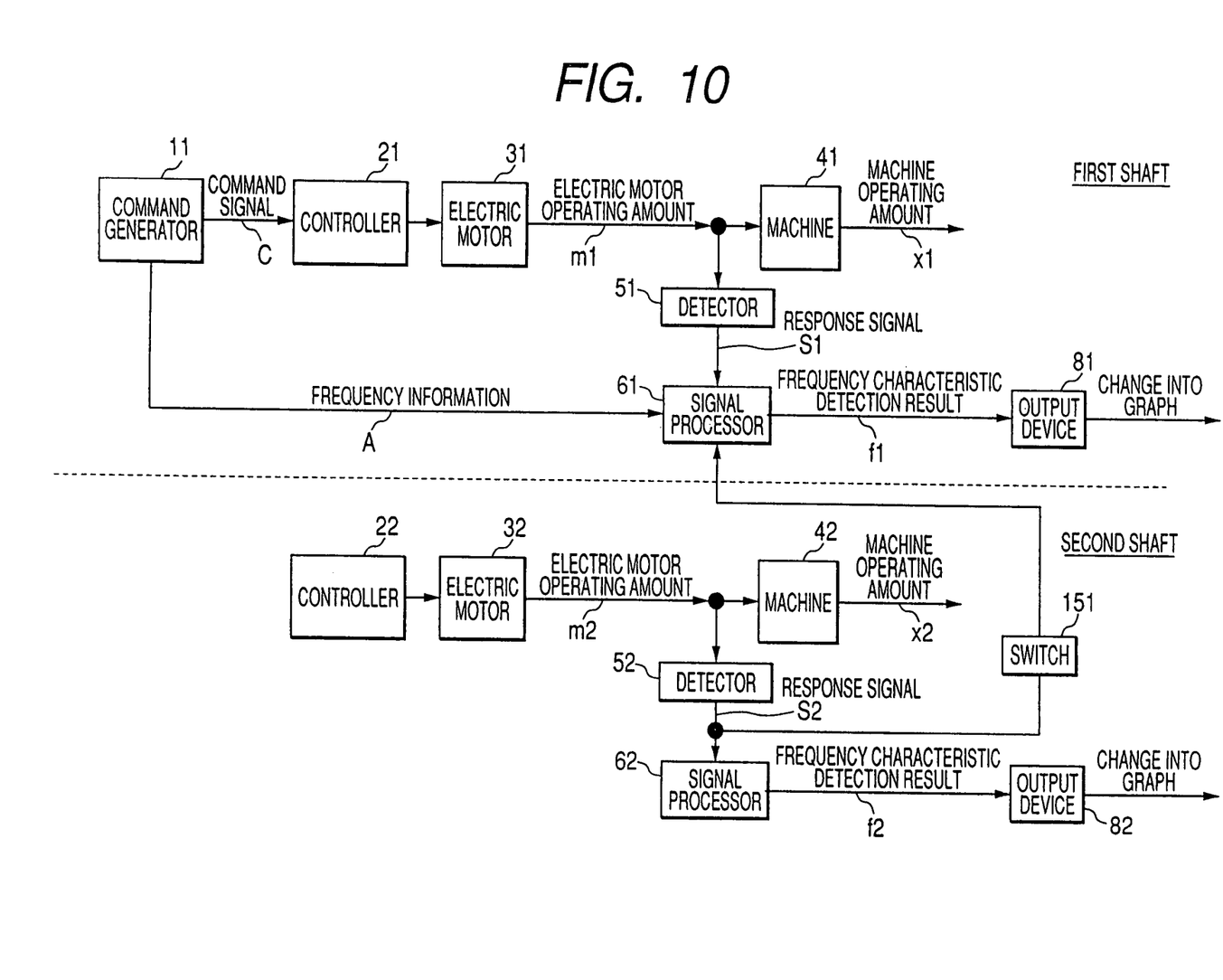
FIG. 10 is a block diagram showing a structure according to a ninth embodiment of the invention.

FIG. 10 is a block diagram according to a ninth embodiment which is different from the first embodiment shown in FIG. 1 in that a frequency information A output from a command generator 11 is input to a signal processor 61 and the calculating method of the signal processor 61 is different.

Figure 11:
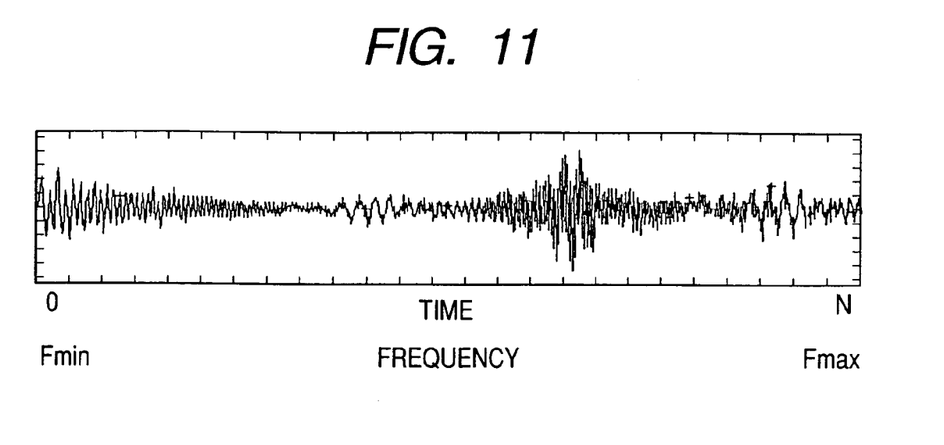
FIG. 11 is a time waveform diagram for a command signal generated by a command generator.

The signal processor 61 receives the frequency information A of a sweep sine wave command and a response signal S1 when a switch 151 is off, and receives the frequency information A of the sweep sine wave command and response signals S1 and S2 when the switch 151 is on. Thus, a calculation for detecting a resonance frequency is carried out based on a detected minimum lower limit frequency Flim exceeding a minimum frequency Fmin. The frequency of a sweep sine wave, which is equal to or higher than the detected minimum lower limit frequency Flim and at which the absolute values of the response signals S1 and S2 are maximized as shown in FIG. 11, is decided to be a resonance frequency so that resonance frequency detection results f1 and f2 are output.

Figure 12:
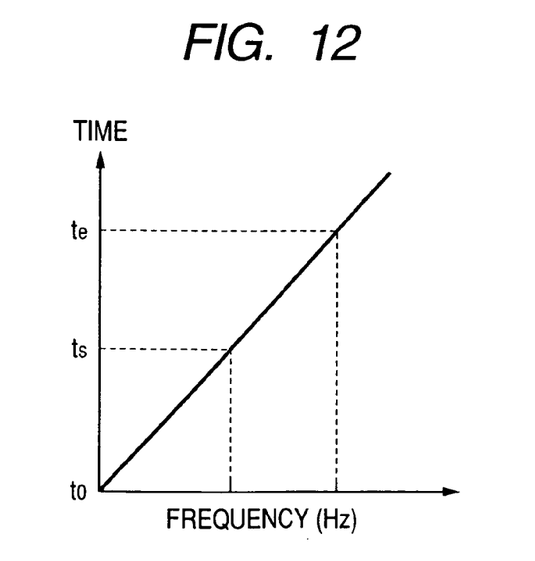
FIG. 12 is a graph showing a relationship between a frequency of a sweep sine wave and a time to which the invention is applied.

FIG. 12 is a graph showing a relationship between the frequency of the sweep sine wave and a time. During a time t0 to te, a sweep sine wave command for changing the frequency from the minimum frequency Fmin to a maximum frequency Fmax through the detected minimum lower limit frequency Flim is set to be a command signal C. The signal processor 61 detects a resonance frequency during a time ts to te in which a higher frequency than the detected minimum lower limit frequency Flim is set. The relationship between the frequency of the sweep sine wave and the time is not restricted to a straight line but may be an optional curve. Moreover, the detected minimum lower limit frequency Flim may be handled in the same manner as the minimum frequency Fmin.

The signal processor 61 can add two response signals or more to be a response signal.

While two electric motor control systems are provided in FIG. 10, the number of the electric motor control systems may be optional.

Figure 13:
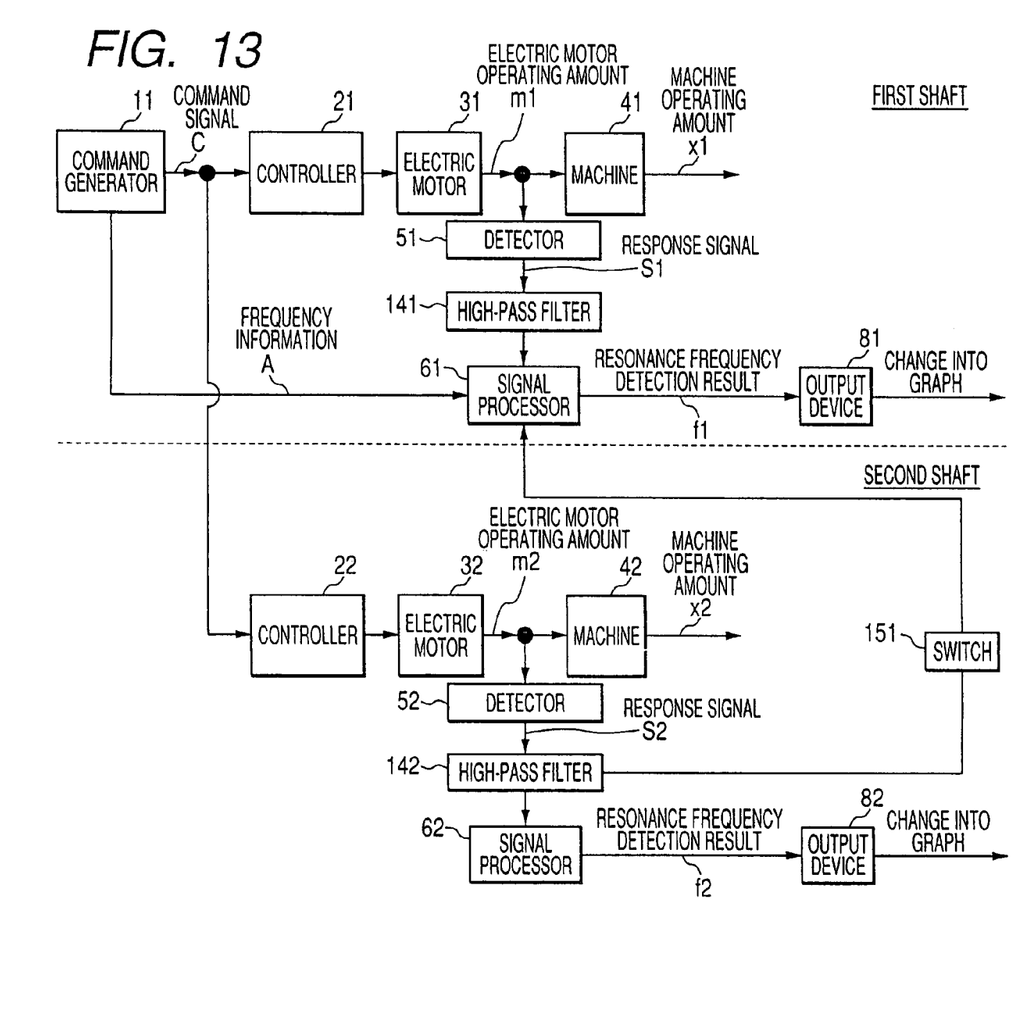
FIG. 13 is a block diagram showing a structure according to a tenth embodiment of the invention.

FIG. 13 is a block diagram showing a structure according to a tenth embodiment. In FIGS. 13, 141 and 142 denote high-pass filter means. Differently from the first embodiment shown in FIG. 1, a command signal C is input to a controller 21 and a frequency information A is input to a signal processor 61, detectors 51 and 52 detect electric motor operating amounts m1 and m2 and transmit, as response signals S1 and S2, the electric motor operating amounts m1 and m2 to signal processors 61 and 62 through the high-pass filter means 141 and 142.

Although the signal processor 61 does not set the condition of a detected minimum lower limit frequency Flim or more in the embodiment, the frequency of a sweep sine wave which is equal to or higher than the detected minimum lower limit frequency Flim and at which the absolute value of a response signal is maximized is decided as a resonance frequency to be output in the same manner as in the eighth embodiment.

In the tenth embodiment, the electric motor operating amounts m1 and m2 of electric motors 31 and 32 to be driven in accordance with a command signal sent from a command generator 11 are detected and signals are input to the signal processors 61 and 62. Consequently, it is possible to detect the resonance frequency of a machine 41 and that of a machine 42 to influence the machine 41. By inputting the sum of the electric motor operating amounts m1 and m2 to the signal processor 61, furthermore, it is possible to grasp the influence of operating shafts.

While two electric motor control systems are provided in FIG. 13, moreover, the number of the electric motor control systems may be optional.

While the detectors 51, 52 and 53 are coupled to the electric motors 31, 32 and 33 to detect the electric motor operating amounts m1, m2 and m3 in the first to tenth embodiments, the detectors 51, 52 and 53 may be coupled to the machines 41, 42 and 43 to directly detect machine operating amounts x1, x2 and x3.

INDUSTRIAL APPLICABILITY

According to the invention, the operating amounts of electric motors to be driven in accordance with a command signal sent from a command generator are detected and the sum of the signals is input to a signal processor. Therefore, it is possible to detect the resonance frequencies of an operating shaft and the other shafts to influence the operating shaft in a machine having the shafts.

Moreover, a resonance frequency is detected, and furthermore, a filter processing portion is provided to automatically input and set a filter processing input value for suppressing the resonance frequency. Consequently, it is possible to automatically enhance the performance of an electric motor control apparatus.

The invention claimed is:

1. A resonance frequency detecting device of a multi-shaft electric motor control apparatus comprising an electric motor control system provided with each of a plurality of shaft of a machine, the electric motor control system having:
   an electric motor for driving one of the plurality of shafts of a machine;
   a controller for driving the electric motor upon receipt of a control command for each of the shafts,
   a detector for detecting an operating amount of the machine;
   a signal processor for analyzing a frequency of a signal of the detector and outputting the frequency as a resonance frequency; and
   an output device for changing a signal of the signal processor into a graph or a numeric value to be output,
   wherein at least one command generator for giving the control command for transmitting a vibration to the machine to at least one of the electric motor control systems is provided to input signals of the detectors to the signal processors and to output them as resonance frequencies.

2. The resonance frequency detecting device of a multi-shaft electric motor control apparatus according to claim 1, wherein the signal processor inputs the signals of the detectors and outputs a sum of the signals as a resonance frequency.

3. The resonance frequency detecting device of a multi-shaft electric motor control apparatus according to claim 1, wherein the detector to detects a position or speed of the electric motor, or a position or speed of a movable portion of the machine.

4. The resonance frequency detecting device of a multi-shaft electric motor control apparatus according to claim 1, wherein in the case in which a part or all of the electric motor control systems is an open loop, a signal of the command generator is input to the controller of the electric motor control system of the open loop.

5. The resonance frequency detecting device of a multi-shaft electric motor control apparatus according to claim 1, further comprising:
   a closed loop controller for giving the controller a control command corresponding to a deviation between a control command sent from the command generator and the operating amount of the machine which is sent from the detector in a part or all of the electric motor control systems.

6. The resonance frequency detecting device of a multi-shaft electric motor control apparatus according to claim 1, further comprising:
   a closed loop controller for outputting a control command corresponding to a deviation between the operating amount of the machine which is sent from the detector and an operation command; and
   a filter processing portion for reducing a signal in a predetermined band included in the control command in a part or all of the electric motor control systems,
   wherein a sum of an output of the filter processing portion and a command signal sent from the command generator are input to the controller.

7. The resonance frequency detecting device of a multi-shaft electric motor control apparatus according to claim 1, wherein the control command is a sweep sine wave signal, and
   the signal processor inputs a frequency information of the sweep sine wave signal output from the command generator and a signal of at least one of the detectors, and outputs a frequency of the sine wave signal at which an absolute value of the signal of the detector is maximized as a resonance frequency.

8. The resonance frequency detecting device of a multi-shaft electric motor control apparatus according to claim 1, wherein the output device outputs a signal of at least one of the signal processors as a frequency characteristic.

9. The resonance frequency detecting device of a multi-shaft electric motor control apparatus according to claim 1, wherein a control command for transmitting a vibration from the command generator to a machine has a frequency limited to a range from a minimum frequency Fmin to a maximum frequency Fmax, and
   the signal processor limits a signal of the detector to a predetermined frequency range and inputs the signal, and detects only a frequency which is equal to or higher than the minimum frequency Fmin.

10. The resonance frequency detecting device of a multi-shaft electric motor control apparatus according to claim 1, wherein a control command for transmitting a vibration from the command generator to the machine has a frequency limited to a range from a minimum frequency Fmin to a maximum frequency Fmax, and
    the signal processor limits a signal of the detector to a predetermined frequency range and inputs the signal, and detects only a frequency which is higher than the minimum frequency Fmin and is equal to or higher than a detected minimum frequency Flim.

11. The resonance frequency detecting device of a multi-shaft electric motor control apparatus according to claim 1, wherein a high-pass filter is provided between the detector and the signal processor.

12. The resonance frequency detecting device of a multi-shaft electric motor control apparatus according to claim 1, wherein a switch for inputting a signal of the detector for one of the shafts to signal processors for another shaft is provided.

* * * * *